United States Patent
Kumayasu et al.

(10) Patent No.: US 6,714,394 B1
(45) Date of Patent: Mar. 30, 2004

(54) ELECTRIC POWER FEEDING LINE SWITCHING METHOD, ELECTRIC POWER FEEDING LINE SWITCHING APPARATUS AND ELECTRIC POWER FEEDING LINE SWITCHING SYSTEM

(75) Inventors: Satoshi Kumayasu, Tokyo (JP); Eiichi Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 599 days.

(21) Appl. No.: 09/711,533

(22) Filed: Nov. 14, 2000

(30) Foreign Application Priority Data

Aug. 11, 2000 (JP) .......................... 2000-244938

(51) Int. Cl.⁷ ................................. H02H 3/00
(52) U.S. Cl. ............... 361/62; 361/64; 361/78
(58) Field of Search .................. 361/62, 64, 66, 361/78, 93.1, 115, 42

(56) References Cited

U.S. PATENT DOCUMENTS 6,188,508 B1 * 2/2001 Horiuchi et al. ............ 359/334

FOREIGN PATENT DOCUMENTS

| EP | 0 935 348 | 8/1999 | |
| JP | 57-025737 | 2/1982 | |
| JP | 1-223830 | 9/1989 | ............ H04B/3/44 |
| JP | 1-243734 | 9/1989 | ............ H02G/15/14 |
| JP | 07-115390 | 5/1995 | |

* cited by examiner

Primary Examiner—Stephen W. Jackson
(74) Attorney, Agent, or Firm—Oblon, Spivak, McClelland, Maier & Neustadt, P.C.

(57) ABSTRACT

A plurality of submarine cable transmission paths extending from a plurality of land-based terminal stations are connected with each other in a submarine branching apparatus, and an electric power feeding line is arranged between each land-based terminal station and an electric power feeding line switching unit of the submarine branching apparatus to supply electric power from the electric power feeding line to a communication signal of the corresponding submarine cable transmission path through repeaters. The electric power feeding lines are connected with each other in the electric power feeding line switching unit. A control signal superposed on the communication signal is sent to the electric power feeding line switching unit through one submarine cable transmission path, and the connection of the electric power feeding lines is switched according to the control signal. Because the switching is performed when the electric power feeding lines are electrically set to a stable state, no electric arc is generated in the switching. Also, each submarine cable transmission path is formed of an optical fiber, so that the electric power is supplied from one electric power feeding line to the control signal of the submarine cable transmission path. Therefore, the control signal is not attenuated, and the connection of the electric power feeding lines can be reliably switched.

20 Claims, 10 Drawing Sheets

F1+F2

F2

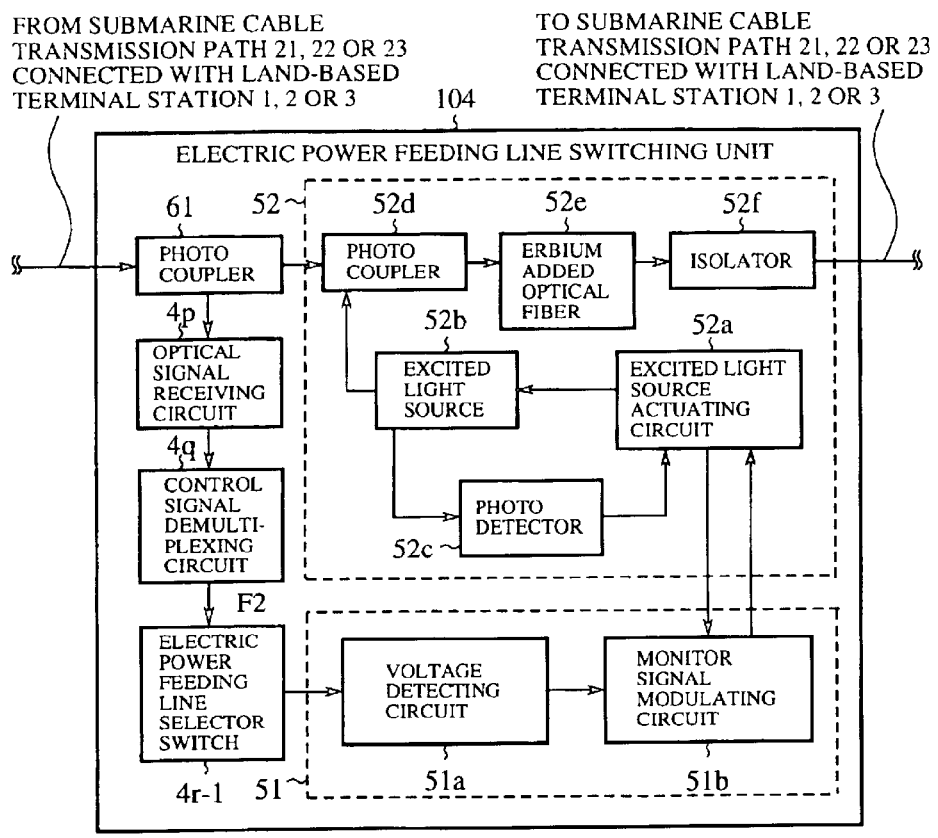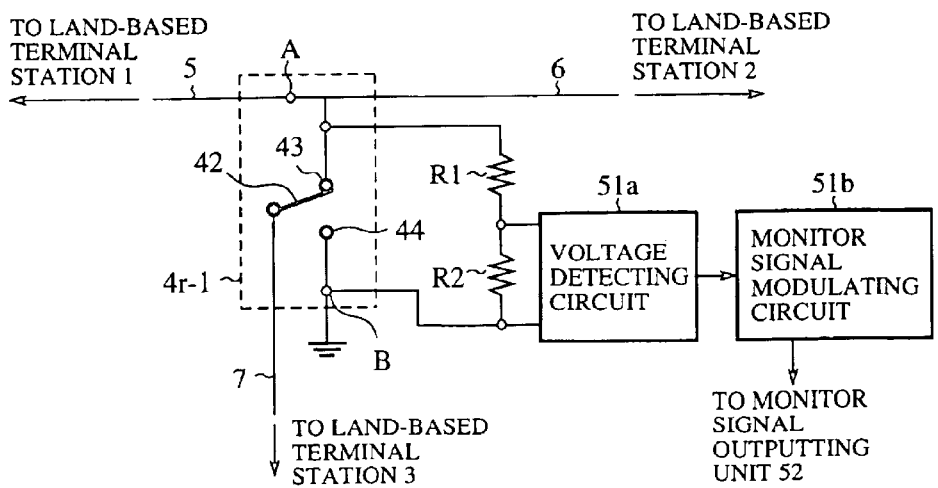

ELECTRIC POWER FEEDING LINE SWITCHING METHOD, ELECTRIC POWER FEEDING LINE SWITCHING APPARATUS AND ELECTRIC POWER FEEDING LINE SWITCHING SYSTEM

BACKGROUND OF THE INVENTION

1. Field of the Invention

The present invention relates to a method and apparatus of switching the connection of electric power feeding lines from which electric power is supplied to a signal passing through an optical fiber transmission path (for example, a transmission path of a submarine cable) through a repeater. Also, the present invention relates to an electric power feeding line switching system in which communication between terminal stations (for example, land-based terminal stations) is performed through the optical fiber transmission paths connected with each other in an optical fiber transmission path branching apparatus and the repeater while electric power is supplied from the electric power feeding lines to the signal of the optical fiber transmission paths.

2. Description of Related Art

A conventional electric power feeding line switching apparatus and a conventional electric power feeding line switching system, "Switching Method and Switching Circuit for Feeder Line of Transmission Path" disclosed in Published Unexamined Japanese Patent Application No. JP1-243734 is known as an example of a conventional electric power feeding line switching method.

FIG. 11 is a constitutional view of a conventional electric power feeding line switching system in which submarine cable transmission paths and repeaters are arranged so as to supply electric power from electric power feeding lines, of which the connection is switched in a conventional electric power feeding line switching apparatus according to a conventional electric power feeding line switching method disclosed in the Application No. JP1-243734, to a signal of the submarine cable transmission paths through the repeaters.

In FIG. 11, 1 indicates a first land-based terminal station, 2 indicates a second land-based terminal station, 3 indicates a third land-based terminal station, 8 indicates a submarine branching apparatus in which a plurality of submarine cable transmission paths are connected with each other at a branching point 24, 21 indicates a first submarine cable transmission path connecting the first land-based terminal station 1 and the submarine branching apparatus 8, 22 indicates a second submarine cable transmission path connecting the second land-based terminal station 2 and the submarine branching apparatus 8, 23 indicates a third submarine cable transmission path connecting the third land-based terminal station 3 and the submarine branching apparatus 8, 11 indicates a repeater arranged on the first submarine cable transmission path 21, 12 indicates another repeater arranged on the first submarine cable transmission path 21, 13 indicates a repeater arranged on the second submarine cable transmission path 22, and 14 indicates another repeater arranged on the second submarine cable transmission path 22. Each of the submarine cable transmission paths 21, 22 and 23 is formed of an optical fiber. An optical signal, which transmits through the first submarine cable transmission path 21 and is attenuated in a long-distance transmission, is amplified in the repeaters 11 and 12. An optical signal, which transmits through the second submarine cable transmission path 22 and is attenuated in a long-distance transmission, is amplified in the repeaters 13 and 14. A length of the third submarine cable transmission path 23 is comparatively short. Therefore, an optical signal of the third submarine cable transmission path 23 is not substantially attenuated, and no repeater is arranged on the third submarine cable transmission path 23.

Also, 5 indicates a first electric power feeding line through which electric power is supplied from the first land-based terminal station 1 to the repeaters 11 and 12, 6 indicates a second electric power feeding line through which electric power is supplied from the second land-based terminal station 2 to the repeaters 13 and 14, 7 indicates a third electric power feeding line extending from the third land-based terminal station 3 to the submarine branching apparatus 8, and 8a indicates an electric power feeding line switching circuit (or a conventional electric power feeding line switching apparatus) arranged in the submarine branching apparatus 8. The electric power feeding line switching circuit 8a normally connects the first electric power feeding line 5 and the second electric power feeding line 6 and normally disconnects the third electric power feeding line 7 from the electric power feeding lines 5 and 6. Therefore, electric power is supplied to the repeaters 11 to 14 to perform the communication between the land-based terminal stations 1 and 2. Also, when a fault occurs in the electric power feeding line 5 (or 6), the electric power feeding line switching circuit 8a switches from the connection between the electric power feeding lines 5 and 6 to another connection between the electric power feeding lines 6 (or 5) and 7.

Also, 23a indicates a control signal line through which a control signal is transmitted from the third land-based terminal station 3 to the electric power feeding line switching circuit 8a to switch a connection relationship among the electric power feeding lines 5 to 7 in the electric power feeding line switching circuit 8a. The control signal line 23a is formed of an optical fiber.

An operation of the conventional electric power feeding line switching system in the above configuration is described.

Electric power is supplied to the repeaters 11 to 14 through the electric power feeding lines 5 and 6, and an optical signal is normally transmitted between the land-based terminal stations 1 and 2 through the submarine cable transmission paths 21 and 22 while amplifying the optical signal in the repeaters 11 to 14.

When a fault occurs, for example, in the first electric power feeding line 5 placed between the first land-based terminal station 1 and the submarine branching apparatus 8, a control signal is transmitted from the third land-based terminal station 3 to the submarine branching apparatus 8 through the control signal line 23a, and a switching circuit of the electric power feeding line switching circuit 8a is operated according to the control signal. The operation of the switching circuit is such that an end of the first electric power feeding line 5, in which the fault occurs, is earthed in the submarine branching apparatus 8 to disconnect the first electric power feeding line 5 from the electric power feeding lines 6 and 7, and the third electric power feeding line 7 is connected with the second electric power feeding line 6 to enable communication between the land-based terminal stations 2 and 3 through the submarine cable transmission paths 22 and 23.

Therefore, even though a fault occurs in the first electric power feeding line 5, the first electric power feeding line 5 is disconnected from the electric power feeding lines 6 and 7, and the third electric power feeding line 7 is connected with the second electric power feeding line 6. Accordingly, electric power can be supplied to the repeaters 13 and 14 through the electric power feeding line 6 connected with the electric power feeding line 7, and a communication between the land-based terminal stations 2 and 3 can be maintained.

However, in cases where a distance between the land-based terminal station 3 and the submarine branching apparatus 8 is long, because the third submarine cable transmission path 23 is lengthened, the control signal is attenuated. In this case, there is a case where the switching circuit of the electric power feeding line switching circuit 8a cannot be correctly operated according to the attenuated control signal. Therefore, there is a problem that it is required to shorten a distance between the land-based terminal station 3 and the submarine branching apparatus 8 or to additionally arrange one or more repeaters on the third submarine cable transmission path 23.

Also, in another prior art, a relay circuit is arranged between the electric power feeding lines 5 and 6 in the electric power feeding line switching circuit 8a so as to be operated according to a feeding current passing through the electric power feeding line 5 or 6. In this prior art, when the feeding current reaches a prescribed value, the relay circuit is operated, and the switching circuit of the electric power feeding line switching circuit 8a is operated according to the feeding current passing through the electric power feeding line 5 or 6 to switch from the connection between the electric power feeding lines 5 and 6 to another connection. However, in this prior art, when a fault occurs in the first electric power feeding line 5, the feeding current is dynamically changed. Therefore, the operation of the switching circuit of the electric power feeding line switching circuit 8a is performed when a large current change occurs in the relay circuit to set the electric power feeding lines 5 and 6 to a dynamic state. In this case, there is a problem that a high voltage is generated in a contacting point of the electric power feeding lines 5 and 6 placed in the switching circuit so as to generate an electric arc.

SUMMARY OF THE INVENTION

An object of the present invention is to provide, with due consideration to the drawbacks of the conventional electric power feeding line switching method, the conventional electric power feeding line switching apparatus and the conventional electric power feeding line switching system, an electric power feeding line switching method, an electric power feeding line switching apparatus and an electric power feeding line switching system in which the connection of a plurality of electric power feeding lines is switched in a static state of electric power feeding lines without limiting a distance between a terminal station and a switching point of the electric power feeding lines. Also, the object of the present invention is to provide an electric power feeding line switching method, an electric power feeding line switching apparatus and an electric power feeding line switching system in which the feeding of electric power to repeaters is easily performed when the operation of the electric power feeding line switching system is started.

The object is achieved by the provision of an electric power feeding line switching method, in which electric power is supplied from each of a plurality of electric power feeding lines to one of a plurality of repeaters with which a plurality of optical fiber transmission paths having a branching point are connected to supply electric power to an optical communication signal transmitting through the optical fiber transmission paths, comprising the steps of:

superposing a control signal on the optical communication signal which transmits through the optical fiber transmission paths; and controlling a connection relationship among the electric power feeding lines according to the control signal superposed on the optical communication signal to switch from one connection of the electric power feeding lines to another connection of the electric power feeding lines.

In the above steps, the control signal superposed on he optical communication signal transmits through one optical fiber transmission path, and the connection relationship among the electric power feeding lines is switched according to the control signal.

Accordingly, because the feeding of electric power to the electric power feeding lines is set to a stable state, the connection of the electric power feeding lines can be switched in the stable state of the electric power feeding lines. Therefore, there is no probability that a high voltage is generated in a connecting point of the electric power feeding lines so as to generate an electric arc, and a connection change of the electric power feeding lines can be reliably performed.

Also, because the control signal transmits through one optical fiber transmission path, even though the optical fiber transmission path is long, electric power can be supplied from the electric power feeding line to the control signal of the optical fiber transmission path through the repeater connected with the optical fiber transmission path to amplify the control signal. Therefore, there is no probability that the control signal is attenuated, and the connection of the electric power feeding lines can be reliably switched according to the control signal regardless of the length of the optical fiber transmission path.

It is preferred that the step of superposing a control signal includes the step of superposing the control signal on the optical communication signal which is transmitted between terminal stations through the optical fiber transmission paths connected with the terminal stations.

Because the control signal passes through one optical fiber transmission path, an optical fiber for transmitting only the control signal is not required. Therefore, the connection of the electric power feeding lines can be reliably switched at a low cost.

It is also preferred that the electric power feeding line switching method further comprises the steps of:

transmitting a second control signal through one optical fiber transmission path, which is connected with one electric power feeding line corresponding to no fault through one repeater, in cases where a fault occurs in one of the electric power feeding lines;

earthing one end of the electric power feeding line corresponding to the fault on a side of a connection point of the electric power feeding lines according to the second control signal to disconnect the electric power feeding line corresponding to the fault from the electric power feeding lines corresponding to no fault; and connecting the electric power feeding lines corresponding to no fault with each other at the connection point to switch from the connection of all electric power feeding lines to another connection of the electric power feeding lines corresponding to no fault.

In the above steps, even though a fault occurs in one electric power feeding line, because the connection switching of the electric power feeding lines is not performed according to a level change of the electric power feeding line but is performed according to the second control signal transmitting through one optical fiber transmission path, the connection of the electric power feeding lines can be switched in the stable state of the electric power feeding lines. Therefore, there is no probability that a high voltage is generated in a connecting point of the electric power feeding lines so as to generate an electric arc, and a connection change of the electric power feeding lines can be reliably performed.

Also, because the electric power feeding line corresponding to the fault is earthed and because the electric power feeding lines corresponding to no fault are connected with each other, communication can be reliably performed through the optical fiber transmission paths corresponding to no fault.

It is also preferred that the electric power feeding line switching method further comprises the steps of earthing one electric power feeding line on a side of a connection point of the electric power feeding lines in an initial state in which the feeding of electric power to the other electric power feeding lines is started.

Because an electrostatic capacity of a system including the electric power feeding lines, the repeaters and the optical fiber transmission paths is reduced in the initial state, the feeding of electric power to the other electric power feeding lines can be easily started.

It is also preferred that the step of controlling a connection relationship includes the step of switching the connection of the electric power feeding lines while monitoring an electric potential difference between an electric potential of the electric power feeding lines connected with each other at a connection point and a ground level.

In the above step, because the electric potential difference is monitored, the connection of the electric power feeding lines can be switched when the electric potential difference is lowered. Therefore, an electric stress such as an induced voltage occurring in the connection switching can be reduced, and the connection of the electric power feeding lines can be switched more stably.

It is also preferred that the step of controlling a connection relationship comprises the steps of:

monitoring an electric potential difference between an electric potential of the electric power feeding lines connected with each other at a connection point and a ground level;

maintaining electric currents supplied to the electric power feeding lines; and switching the connection of the electric power feeding lines when the monitored electric potential difference is minimized.

In the above steps, because the connection of the electric power feeding lines is switched when the monitored electric potential difference is minimized, an electric stress such as an induced voltage occurring in the connection switching can be reduced, and the connection of the electric power feeding lines can be switched more stably.

It is also preferred that the step of controlling a connection relationship includes the step of switching the connection of the electric power feeding lines while reducing an electric current, which is supplied to a connection point of the electric power feeding lines, to a minimum current required to switch the connection of the electric power feeding lines.

In the above steps, because the connection of the electric power feeding lines is switched when the electric current supplied to a connection point of the electric power feeding lines is reduced to a minimum current, an electric stress such as an induced voltage occurring in the connection switching can be reduced, and the connection of the electric power feeding lines can be switched more stably.

It is also preferred that the step of controlling a connection relationship comprises the steps of:

controlling an electric current, which is supplied to a connection point of the electric power feeding lines, to a minimum current required to switch the connection of the electric power feeding lines;

demultiplexing the control signal from the optical communication signal; and automatically switching the connection of the electric power feeding lines according to the control signal demultiplexed from the optical communication signal after the electric current is controlled to the minimum current.

In the above steps, because the connection of the electric power feeding lines is switched after the electric current supplied to a connection point of the electric power feeding lines is controlled to a minimum current, an electric stress such as an induced voltage occurring in the connection switching can be reduced, and the connection of the electric power feeding lines can be switched more stably.

The object is achieved by the provision of an electric power feeding line switching apparatus, in which a connection of a plurality of electric power feeding lines, each of which is connected with an optical fiber transmission path through a repeater to supply electric power from the electric power feeding lines to an optical communication signal of the optical fiber transmission paths through the repeaters, is switched, comprising:

optical signal receiving means for receiving the optical communication signal which includes a control signal and transmits through the optical fiber transmission paths;

control signal demultiplexing means for detecting the control signal by demultiplexing the control signal from the optical communication signal received by the optical signal receiving means; and an electric power feeding line selector switch for controlling the connection of the electric power feeding lines according to the control signal detected by the control signal demultiplexing means by switching one connection of the electric power feeding lines to another connection of the electric power feeding lines.

In the above configuration, the switching of the connection of the electric power feeding lines is performed according to the control signal which is transmitted through one optical fiber transmission path with the optical communication signal.

Accordingly, the connection of the electric power feeding lines can be switched according to the control signal when the electric power feeding lines are electrically set to a stable state. Therefore, there is no probability that a high voltage is generated in a connecting point of the electric power feeding lines so as to generate an electric arc, and a connection change of the electric power feeding lines can be reliably performed.

Also, because the control signal transmits through one optical fiber transmission path, even though the optical fiber transmission path is long, electric power can be supplied from the electric power feeding line to the control signal of the optical fiber transmission path through the repeater connected with the optical fiber transmission path to amplify the control signal. Therefore, there is no probability that the control signal is attenuated, and the connection of the electric power feeding lines can be reliably switched according to the control signal regardless of the length of the optical fiber transmission path.

It is preferred that a second control signal, which transmits through one optical fiber transmission path connected with one electric power feeding line corresponding to no fault through one repeater, is received by the optical signal receiving means in cases where a fault occurs in one of the electric power feeding lines, one end of the electric power feeding line corresponding to the fault is earthed on a side of a connection point of the electric power feeding lines according to the second control signal by the electric power feeding line selector switch to disconnect the electric power feeding line corresponding to the fault from the electric power feeding lines corresponding to no fault, and the electric power feeding lines corresponding to no fault are connected with each other at the connection point according to the second control signal by the electric power feeding line selector switch to switch from the connection of all electric power feeding lines to another connection of the electric power feeding lines corresponding to no fault.

In the above configuration, even though a fault occurs in one electric power feeding line, because the connection switching of the electric power feeding lines is not performed according to a level change of the electric power feeding line but is performed according to the second control signal transmitting through one optical fiber transmission path, the connection of the electric power feeding lines can be switched in the stable state of the electric power feeding lines. Therefore, there is no probability that a high voltage is generated in a connecting point of the electric power feeding lines so as to generate an electric arc, and a connection change of the electric power feeding lines can be reliably performed.

Also, in view of the fact that the electric power feeding line corresponding to the fault is earthed and because the electric power feeding lines corresponding to no fault are connected with each other, communication can be reliably performed through the optical fiber transmission paths corresponding to no fault.

It is also preferred that one electric power feeding line is earthed on a side of a connection point of the electric power feeding lines in an initial state, in which the feeding of the electric power to the other electric power feeding lines is started, by the electric power feeding line selector switch.

Because an electrostatic capacity of a system including the electric power feeding lines, the repeaters and the optical fiber transmission paths is reduced in the initial state, the feeding of electric power to the other electric power feeding lines can be easily started.

It is also preferred that the electric power feeding line switching apparatus further comprises:
  monitoring means for monitoring an electric potential difference between an electric potential at a terminal of the electric power feeding line selector switch at which the electric power feeding lines are connected with each other and a ground level at another terminal of the electric power feeding line selector switch; and
  monitor signal outputting means for producing an optical monitor signal indicating the electric potential difference monitored by the monitoring means and outputting the optical monitor signal to one of the optical fiber transmission paths.

In the above configuration, because the electric potential difference is monitored, the connection of the electric power feeding lines can be switched when it is detected according to the optical monitor signal that the electric potential difference is lowered. Therefore, an electric stress such as an induced voltage occurring in the connection switching can be reduced, and the connection of the electric power feeding lines can be switched more stably.

It is also preferred that the electric power feeding line switching apparatus further comprises:
  selector switch controlling means for transmitting the control signal detected by the control signal demultiplexing means to the electric power feeding line selector switch after an electric current supplied to a connection point of the electric power feeding lines is reduced to a minimum current required to switch the connection of the electric power feeding lines, wherein the connection of the electric power feeding lines is switched according to the control signal transmitted from the selector switch controlling means by the electric power feeding line selector switch after the electric current is reduced to the minimum current.

In the above configuration, because the connection of the electric power feeding lines is switched after the monitored electric potential difference is minimized, an electric stress such as an induced voltage occurring in the connection switching can be reduced, and the connection of the electric power feeding lines can be switched more stably.

It is also preferred that the electric power feeding line selector switch has a for-opening-feeding-line selector switching element for making one end of one electric power feeding line open on a side of a connection point of the electric power feeding lines.

Because one electric power feeding line can be made open, the electric power feeding line switching apparatus can be applied to various connection types of electric power feeding lines.

The object is also achieved by the provision of an electric power feeding line switching system, in which a connection of a plurality of electric power feeding lines, each of which is connected with an optical fiber transmission path through a repeater to supply electric power from the electric power feeding lines to an optical communication signal of the optical fiber transmission paths through the repeaters, is switched, comprising:
  a plurality of terminal stations, each of which is connected with one optical fiber transmission path and one electric power feeding line, for performing a communication operation by transmitting the optical communication signal through the optical fiber transmission paths, supplying the electric power to the electric power feeding lines, superposing a control signal on the optical communication signal and outputting the control signal superposed on the optical communication signal; and
  an electric power feeding line switching apparatus for receiving the electric power from the terminal stations through the electric power feeding lines and switching from one connection of the electric power feeding lines to another connection of the electric power feeding lines according to the control signal transmitted from one of the terminal stations through one optical fiber transmission path.

In the above configuration, the switching of the connection of the electric power feeding lines is performed according to the control signal which is transmitted from one terminal station to the electric power feeding line switching apparatus through one optical fiber transmission path with the optical communication signal.

Accordingly, the connection of the electric power feeding lines can be switched according to the control signal when the electric power feeding lines are electrically set to a stable state, there is no probability that a high voltage is generated in a connecting point of the electric power feeding lines so as to generate an electric arc, and a connection change of the electric power feeding lines can be reliably performed.

Also, because the control signal transmits through one optical fiber transmission path, even though the optical fiber transmission path is long, electric power can be supplied from the electric power feeding line to the control signal of the optical fiber transmission path through the repeater connected with the optical fiber transmission path to amplify the control signal. Therefore, there is no probability that the control signal is attenuated, and the connection of the electric power feeding lines can be reliably switched according to the control signal regardless of the length of the optical fiber transmission path.

It is preferred that the electric power feeding line switching apparatus comprises optical signal receiving means for receiving the optical communication signal which includes a control signal and transmits through the optical fiber transmission paths;

control signal demultiplexing means for detecting the control signal by demultiplexing the control signal from the optical communication signal received by the optical signal receiving means; and an electric power feeding line selector switch for controlling the connection of the electric power feeding lines according to the control signal detected by the control signal demultiplexing means by switching one connection of the electric power feeding lines to another connection of the electric power feeding lines.

Because the connection of the electric power feeding lines can be switched according to the control signal when the electric power feeding lines are electrically set to a stable state, a connection change of the electric power feeding lines can be reliably performed.

Also, because the control signal transmits through one optical fiber transmission path, even though the optical fiber transmission path is long, the connection of the electric power feeding lines can be reliably switched according to the control signal regardless of the length of the optical fiber transmission path.

It is preferred that the electric power is supplied from one or more terminal stations connected with one or more electric power feeding lines corresponding to no fault in cases where a fault occurs in one of the electric power feeding lines, a second control signal is transmitted from one terminal station, which is connected with electric power feeding line corresponding to no fault, to the electric power feeding line switching apparatus through the optical fiber transmission path connected with the terminal station, one end of the electric power feeding line corresponding to the fault is earthed on a side of a connection point of the electric power feeding lines according to the second control signal by the electric power feeding line switching apparatus to disconnect the electric power feeding line corresponding to the fault from the electric power feeding lines corresponding to no fault, and the electric power feeding lines corresponding to no fault are connected with each other at the connection point according to the second control signal by the electric power feeding line switching apparatus to switch from the connection of all electric power feeding lines to another connection of the electric power feeding lines corresponding to no fault.

In the above configuration, even though a fault occurs in one electric power feeding line, because the connection switching of the electric power feeding lines is not performed according to a level change of the electric power feeding line but is performed according to the second control signal transmitting through one optical fiber transmission path, the connection of the electric power feeding lines can be switched in the stable state of the electric power feeding lines. Therefore, there is no probability that a high voltage is generated in a connecting point of the electric power feeding lines so as to generate an electric arc, and a connection change of the electric power feeding lines can be reliably performed.

Also, because the electric power feeding line corresponding to the fault is earthed and because the electric power feeding lines corresponding to no fault are connected with each other, communication can be reliably performed through the optical fiber transmission paths corresponding to no fault.

It is also preferred that one electric power feeding line is earthed on a side of a connection point of the electric power feeding lines in an initial state, in which the feeding of the electric power to the other electric power feeding lines is started, by the electric power feeding line switching apparatus.

Because an electrostatic capacity of a system including the electric power feeding lines, the repeaters and the optical fiber transmission paths is reduced in the initial state, the feeding of the electric power to the other electric power feeding lines can be easily started. It is also preferred that the electric power feeding line switching apparatus comprises:

monitoring means for monitoring an electric potential difference between an electric potential of a connection point of the electric power feeding lines connected with each other and a ground level; and monitor signal outputting means for producing an optical monitor signal indicating the electric potential difference monitored by the monitoring means and outputting the optical monitor signal to one terminal station through one optical fiber transmission path connected with the terminal station, the connection of the electric power feeding lines is switched according to the control signal by the electric power feeding line switching apparatus while the terminal station monitoring the electric potential difference according to the optical monitor signal.

In the above configuration, because the electric potential difference is monitored, the connection of the electric power feeding lines can be switched when it is detected according to the optical monitor signal that the electric potential difference is lowered. Therefore, an electric stress such as an induced voltage occurring in the connection switching can be reduced, and the connection of the electric power feeding lines can be switched more stably.

It is also preferred that the terminal station supplies a feeding current to the electric power feeding lines to maintain the feeding current supplied to the electric power feeding line switching apparatus while monitoring the electric potential difference according to the optical monitor signal, the terminal station controls the feeding current to minimize the electric potential difference, and the electric power feeding line switching apparatus switches the connection of the electric power feeding lines in cases where the electric potential difference is minimized.

In the above configuration, because the connection of the electric power feeding lines is switched when the monitored electric potential difference is minimized, an electric stress such as an induced voltage occurring in the connection switching can be reduced, and the connection of the electric power feeding lines can be switched more stably.

It is also preferred that the electric power feeding line switching apparatus comprises:

selector switch controlling means for controlling the connection switching of the electric power feeding lines to switch the connection of the electric power feeding lines according to the control signal after an electric current supplied to a connection point of the electric power feeding lines is reduced by one terminal station to a minimum current required to switch the connection of the electric power feeding lines.

In the above configuration, because the connection of the electric power feeding lines is switched after the monitored electric potential difference is minimized, an electric stress such as an induced voltage occurring in the connection switching can be reduced, and the connection of the electric power feeding lines can be switched more stably.

It is also preferred that the electric power feeding line switching apparatus has a for-opening-feeding-line selector switching element for making one end of one electric power feeding line open on a side of a connection point of the electric power feeding lines.

Because one electric power feeding line can be made open, the electric power feeding line switching system can be applied to various connection types of electric power feeding lines.

BRIEF DESCRIPTION OF THE DRAWINGS

FIG. 6A is a block diagram of an electric power feeding line switching unit of a submarine branching apparatus arranged in an electric power feeding line switching system according to a third embodiment of the present invention;

FIG. 6B is a conceptual view of a switching-unit-voltage monitoring unit of the electric power feeding line switching unit shown in FIG. 6A;

DETAILED DESCRIPTION OF THE PREFERRED EMBODIMENTS

The invention will now be described with reference to the accompanying drawings.

Embodiment 1

Figure 1:
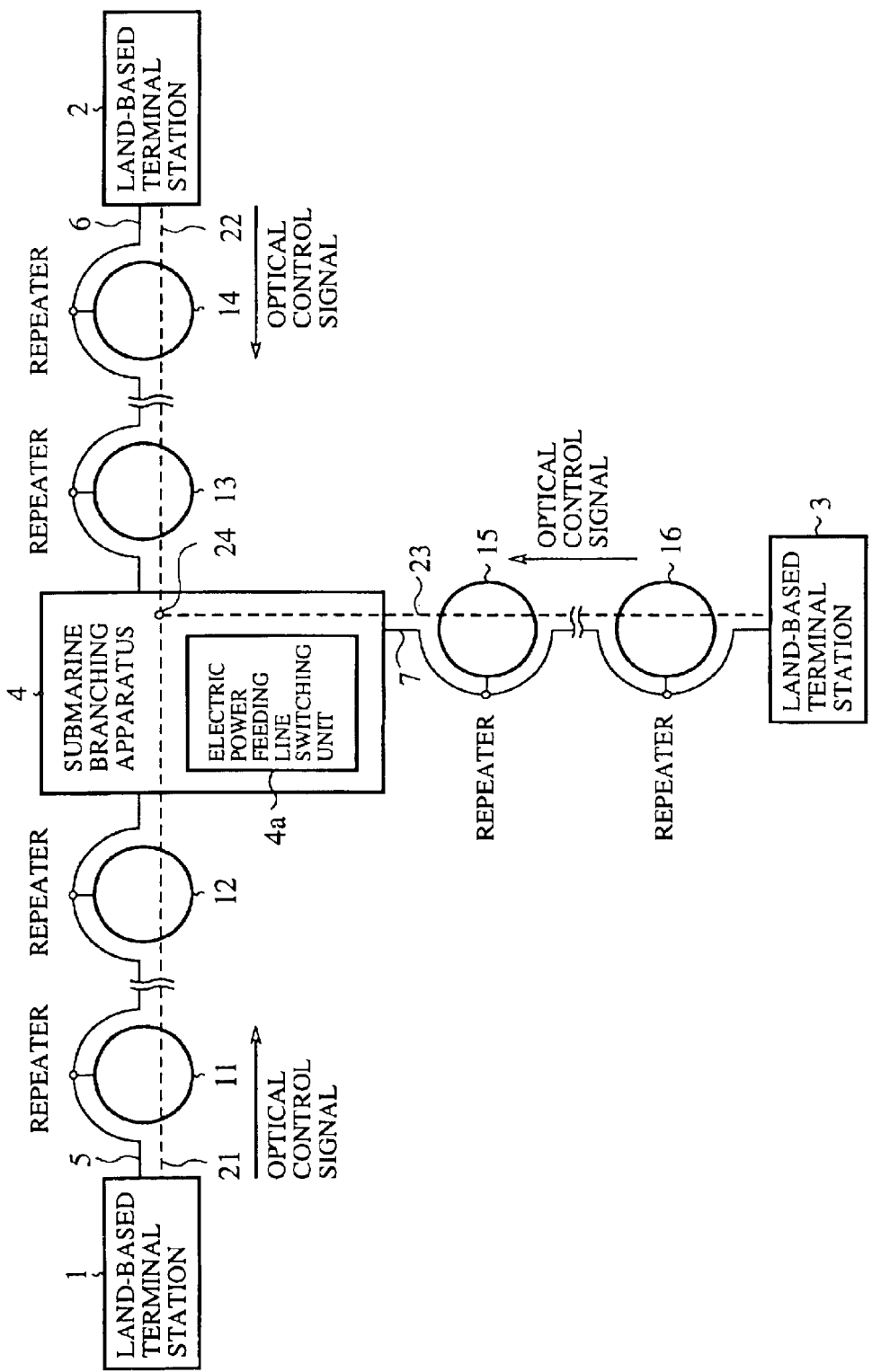
FIG. 1 is a constitutional view of an electric power feeding line switching system, in which electric power feeding lines are arranged with submarine cable transmission paths and repeaters so as to supply electric power from each electric power feeding line to a signal of the corresponding submarine cable transmission path through the corresponding repeaters, according to a first embodiment of the present invention.

FIG. 1 is a constitutional view of an electric power feeding line switching system, in which electric power feeding lines are arranged with submarine cable transmission paths and repeaters so as to supply electric power from each electric power feeding line to a signal of the corresponding submarine cable transmission path through the corresponding repeaters, according to a first embodiment of the present invention.

In FIG. 1, 1 indicates a first land-based terminal station (or a terminal station), 2 indicates a second land-based terminal station (or a terminal station), 3 indicates a third land-based terminal station (or a terminal station), 4 indicates a submarine branching apparatus in which a plurality of submarine cable transmission paths are connected with each other at a branching point 24, 21 indicates a first submarine cable transmission path connecting the first land-based terminal station 1 and the submarine branching apparatus 4, 22 indicates a second submarine cable transmission path connecting the second land-based terminal station 2 and the submarine branching apparatus 4, 23 indicates a third submarine cable transmission path connecting the third land-based terminal station 3 and the submarine branching apparatus 4, 11 indicates a repeater arranged on the first submarine cable transmission path 21, 12 indicates another repeater arranged on the first submarine cable transmission path 21, 13 indicates a repeater arranged on the second submarine cable transmission path 22, 14 indicates another repeater arranged on the second submarine cable transmission path 22, 15 indicates a repeater arranged on the third submarine cable transmission path 23, and 16 indicates another repeater arranged on the third submarine cable transmission path 23. Each of the submarine cable transmission paths 21, 22 and 23 is formed of an optical fiber to transmit an optical signal through the optical fiber. An optical signal, which transmits through the first submarine cable transmission path 21 and is attenuated in a long-distance transmission, is amplified in the repeaters 11 and 12. An optical signal, which transmits through the second submarine cable transmission path 22 and is attenuated in a long-distance transmission, is amplified in the repeaters 13 and 14. An optical signal, which transmits through the second submarine cable transmission path 23 and is attenuated in a long-distance transmission, is amplified in the repeaters 15 and 16.

Also, 5 indicates a first electric power feeding line through which electric power is supplied from the first land-based terminal station 1 to the repeaters 11 and 12 and the submarine branching apparatus 4, 6 indicates a second electric power feeding line through which electric power is supplied from the second land-based terminal station 2 to the repeaters 13 and 14 and the submarine branching apparatus 4, 7 indicates a third electric power feeding line through which electric power is supplied from the third land-based terminal station 3 to the repeaters 15 and 16 and the submarine branching apparatus 4, and 4a indicates an electric power feeding line switching unit (or an electric power feeding line switching apparatus) arranged in the submarine branching apparatus 4. A connection relationship among the electric power feeding lines 5, 6 and 7 is selected in the electric power feeding line switching unit 4a.

Figure 2:
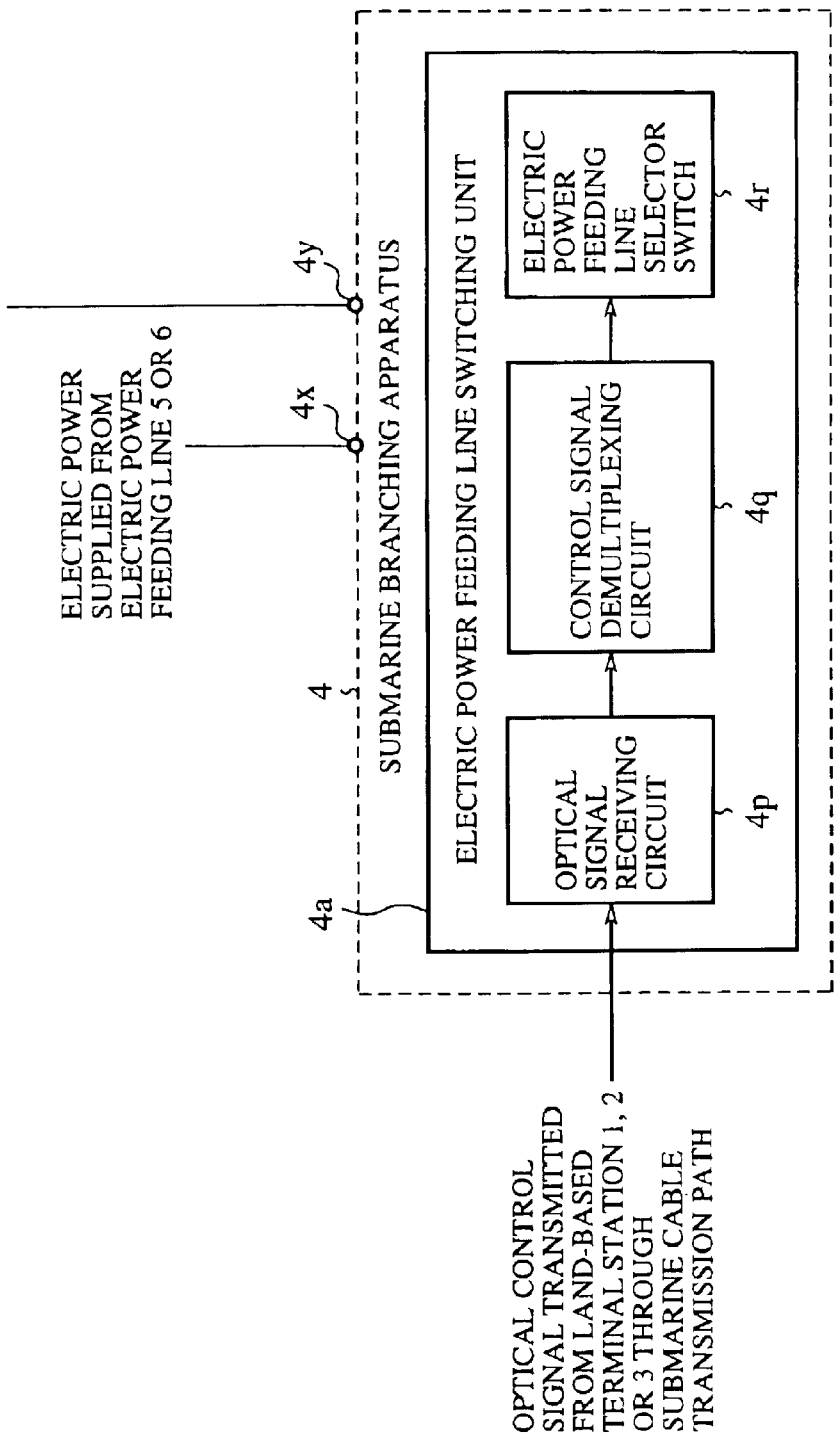
FIG. 2 is a block diagram of an electric power feeding line switching unit arranged in a submarine branching apparatus shown in FIG. 1.

FIG. 2 is a block diagram of the electric power feeding line switching unit 4a arranged in the submarine branching apparatus 4. In FIG. 2, 4x indicates an electric power feeding terminal at which electric power supplied from the electric power feeding line 5 or 6 is received to supply electric power to the submarine branching apparatus 4. 4y indicates an electric power feeding terminal at which electric power supplied from the electric power feeding line 7 is received to supply electric power to the submarine branching apparatus 4. 4p indicates an optical signal receiving circuit arranged in the electric power feeding line switching unit 4a. An optical communication signal transmitted from the land-based terminal station 1, 2 or 3 through the submarine cable transmission path 21, 22 or 23 is received in the optical signal receiving circuit 4p. 4q indicates a control signal demultiplexing circuit arranged in the electric power feeding line switching unit 4a. In the control signal demultiplexing circuit 4q, an optical control signal is demultiplexed from the optical communication signal received in the optical signal receiving circuit 4p. 4r indicates an electric power feeding line selector switch arranged in the electric power feeding line switching unit 4a. In the electric power feeding line selector switch 4r, the connection of electric power feeding lines 5, 6 and 7 is switched according to the optical control signal demultiplexted in the control signal demultiplexing circuit 4q.

Figure 3A:
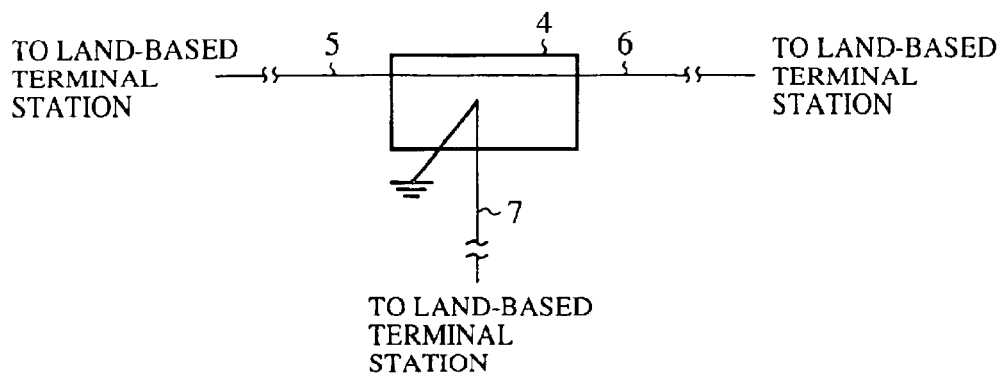
FIG. 3A shows a line connection relationship in which a pair of electric power feeding lines are connected with each other and another electric power feeding line is disconnected from the pair of electric power feeding lines by earthing one end of the electric power feeding line.
Figure 3B:
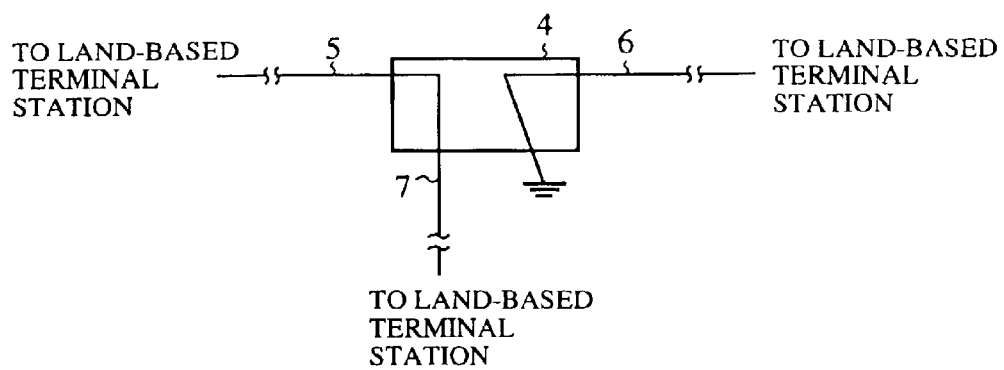
FIG. 3B shows a line connection relationship in which another pair of electric power feeding lines are connected with each other and another electric power feeding line is disconnected from the pair of electric power feeding lines by earthing one end of the electric power feeding line.
Figure 3C:
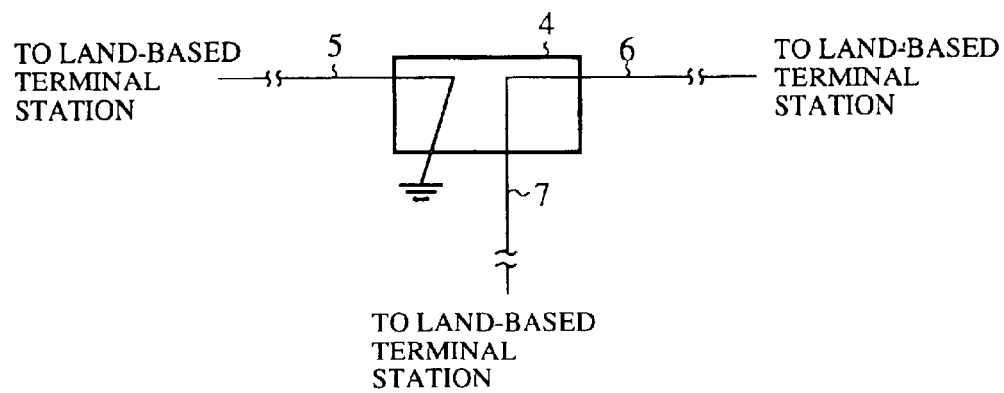
FIG. 3C shows a line connection relationship in which another pair of electric power feeding lines are connected with each other and another electric power feeding line is disconnected from the pair of electric power feeding lines by earthing one end of the electric power feeding line.
Figure 4A:
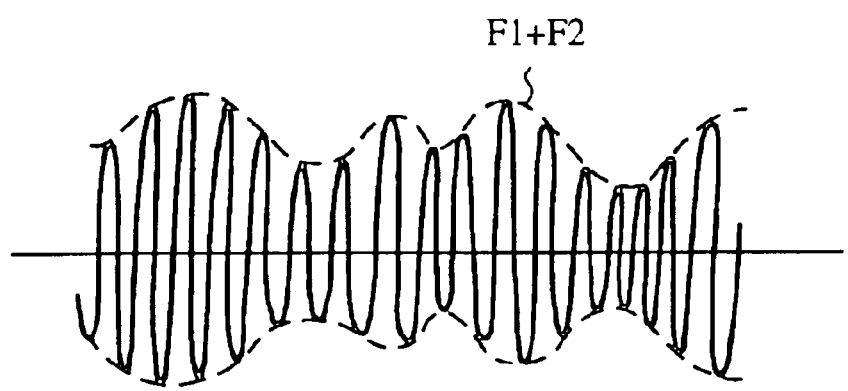
FIG. 4A shows an optical control signal F2 superposed on an optical communication signal F1.
Figure 4B:
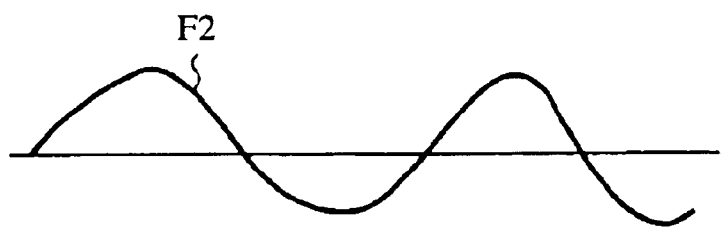
FIG. 4B shows the optical control signal F2 demultiplexed from the optical communication signal F1.

FIG. 3A shows a line connection relationship in which the electric power feeding lines 5 and 6 are connected with each other and the electric power feeding line 7 is disconnected from the electric power feeding lines 5 and 6 by earthing one end of the electric power feeding line 7, FIG. 3B shows a line connection relationship in which the electric power feeding lines 5 and 7 are connected with each other and the electric power feeding line 6 is disconnected from the electric power feeding lines 5 and 7 by earthing one end of the electric power feeding line 6, FIG. 3C shows a line connection relationship in which the electric power feeding lines 6 and 7 are connected with each other and the electric power feeding line 5 is disconnected from the electric power feeding lines 6 and 7 by earthing one end of the electric power feeding line 5, FIG. 4A shows an optical control signal F2 superposed on an optical communication signal F1, and FIG. 4B shows the optical control signal F2 demultiplexed from the optical communication signal F1.

In the above configuration, an operation of the electric power feeding line switching system is described.

A communication is performed between the first land-based terminal station 1 and the second land-based terminal station 2 in a normal operation. In this normal operation, as shown in FIG. 3A, the first electric power feeding line 5 and the second electric power feeding line 6 are connected with each other by the function of the electric power feeding line switching unit 4a, and the third electric power feeding line 7 is disconnected from the electric power feeding lines 5 and 6. Also, electric power is supplied from the electric power feeding lines 5 and 6 to the repeaters 11 to 14 to perform the communication between the land-based terminal stations 1 and 2, and electric power is supplied from the electric power feeding line 7 to the repeaters 15 to 16. Also, electric power is supplied from the electric power feeding lines 5 to 7 to the submarine branching apparatus 4 through the electric power feeding terminals 4x and 4y.

An electric power feeding line selecting operation, which is performed in cases where no fault occurs in each of the electric power feeding lines 5, 6 and 7, is initially described.

In cases where an operator desires to connect the electric power feeding lines 6 and 7 with each other and disconnect the electric power feeding line 5 from the electric power feeding lines 6 and 7, as shown in FIG. 4A, an optical control signal F2 indicating the selection of the pair of electric power feeding lines 6 and 7 is superposed on an optical communication signal F1, which is transmitted between the first land-based terminal station 1 and the second land-based terminal station 2, in the first land-based terminal station 1. In this embodiment, the optical communication signal F1 is obtained by performing amplitude modulation for an optical signal of a wavelength $\lambda$, and the control signal F2 is obtained by performing amplitude modulation for an optical signal of a wavelength which can be demultiplexed from the communication signal F1 of the wavelength $\lambda$.

Thereafter, the optical communication signal F1 including the optical control signal F2 is transmitted from the first land-based terminal station 1 to the electric power feeding line switching unit 4a of the submarine branching apparatus 4 through the submarine cable transmission path 21. In the electric power feeding line switching unit 4a, the optical communication signal F1 including the optical control signal F2 is received in the optical signal receiving circuit 4p, the optical control signal F2 is demultiplexed from the optical communication signal F1 in the control signal demultiplexing circuit 4q, and the electric power feeding lines 6 and 7 are selected according to the optical control signal F2 in the electric power feeding line selector switch 4r. Therefore, the electric power feeding lines 6 and 7 are connected with each other, and the electric power feeding line 5 is disconnected from the electric power feeding lines 6 and 7 by earthing one end of the electric power feeding line 5 placed on a side of the submarine branching apparatus 4 (refer to FIG. 3C).

In the first embodiment, the optical communication signal F1 including the optical control signal F2 is transmitted from the first land-based terminal station 1 to the electric power feeding line switching unit 4a. However, it is applicable that the optical communication signal F1 including the optical control signal F2 be transmitted from the second land-based terminal station 2 to the electric power feeding line switching unit 4a, or it is applicable that the optical communication signal F1 be transmitted from the third land-based terminal station 3 to the electric power feeding line switching unit 4a.

Next, an electric power feeding line selecting operation, which is performed in cases where a fault occurs in the electric power feeding line 5 placed between the first land-based terminal station 1 and the submarine branching apparatus 4, is described.

In cases where a fault occurs in the electric power feeding line 5, each of the repeaters 11 and 12, through which electric power is to be supplied from the electric power feeding line 5 to an optical signal of the first submarine cable transmission path 21, is not correctly operated. Therefore, in this operation, all electric power feeding operations from the land-based terminal stations 1 to 3 to the repeaters 11 to 16 through the electric power feeding lines 5 to 7 are once stopped, and the electric power feeding operation from the third land-based terminal station 3 to the repeaters 15 and 16 through the electric power feeding line 7 is started. Therefore, the repeaters 15 and 16 are correctly operated, and electric power is sent from the third land-based terminal station 3 to the electric power feeding terminal 4y through the electric power feeding line 7 and is supplied to the submarine branching apparatus 4. Thereafter, an optical control signal F2 indicating the selection of the electric power feeding lines 6 and 7 corresponding to no fault is produced in the third land-based terminal station 3, and the optical control signal F2 is transmitted from the third land-based terminal station 3 to the electric power feeding line switching unit 4a of the submarine branching apparatus 4 through the third submarine cable transmission path 23. In the electric power feeding line switching unit 4a, the optical control signal F2 is received in the optical signal receiving circuit 4p, and the electric power feeding lines 6 and 7 are selected according to the optical control signal F2 in the electric power feeding line selector switch 4r. Therefore, the electric power feeding lines 6 and 7 are connected with each other, and the electric power feeding line 5 is disconnected from the electric power feeding lines 6 and 7 by earthing one end of the electric power feeding line 5 placed on a side of the submarine branching apparatus 4.

In the first embodiment, the optical control signal F2 is transmitted from the third land-based terminal station 3 to the electric power feeding line switching unit 4a through the first submarine cable transmission path. However, it is applicable that the optical control signal F2 be transmitted from the second land-based terminal station 2 to the electric power feeding line switching unit 4a through the second submarine cable transmission path 22.

Also, in the first embodiment, a submarine cable transmission path of a short length is not arranged in the electric power feeding line switching system shown in FIG. 1. However, it is applicable that a submarine cable transmission path of a short length be additionally arranged in the electric power feeding line switching system.

Accordingly, in the first embodiment, even though a fault occurs in the electric power feeding line 5, electric power is supplied to the repeaters 15 and 16 (or the repeaters 13 and 14) and the submarine branching apparatus 4 through the third electric power feeding line 7 (or the second electric power feeding line 6) corresponding to no fault to electrically set the submarine branching apparatus 4 and the third submarine cable transmission path 23 (or the second submarine cable transmission path 22) to a stable state, and the connection of the electric power feeding lines 5 and 6 is changed to the connection of the electric power feeding lines 6 and 7 by the function of the electric power feeding line switching unit 4a by transmitting the optical control signal F2 to the electric power feeding line switching unit 4a. Therefore, because the submarine branching apparatus 4 and the third submarine cable transmission path 23 (or the second submarine cable transmission path 22) are set to a stable state, there is no probability that a high voltage is generated in a contacting point of the electric power feeding line selector switch 4r so as to generate an electric arc, and the connection of electric power feeding lines can be reliably switched.

Also, in the first embodiment, the optical control signal F2 superposed on the communication signal F1 (or the optical control signal F2 itself) is transmitted from the land-based terminal station 1, 2 or 3 to the submarine branching apparatus 4, and the connection of electric power feeding lines is switched according to the optical control signal F2. Therefore, no signal line is required to transmit only the optical control signal F2 to the submarine branching apparatus 4.

Also, in the first embodiment, even though a fault occurs in the electric power feeding line 5, electric power is supplied to the repeaters 15 and 16 (or the repeaters 13 and 14) corresponding to no fault, and the optical control signal F2 is transmitted from the third land-based terminal station 3 (or the second land-based terminal station 2) to the submarine branching apparatus 4 through the third submarine cable transmission path 23 (or the second submarine cable transmission path 22) while being amplified in the repeaters 15 and 16 (or the repeaters 13 and 14). Therefore, even though a distance between the third land-based terminal station 3 (or the second land-based terminal station 2) and the submarine branching apparatus 4 is long, the optical control signal F2 can be reliably transmitted to the submarine branching apparatus 4, and the connection of electric power feeding lines can be reliably switched according to the optical control signal F2.

In the first embodiment, the electric power feeding line switching system is applied to a submarine cable transmission. However, the present invention is not limited to the submarine cable transmission, and the electric power feeding line switching system can be applied to a cable transmission in which an operator cannot easily approach repeaters and transmission paths. For example, the electric power feeding line switching system is useful for an underground cable transmission in which repeaters and transmission paths are laid under the ground.

Embodiment 2

Figure 5A:
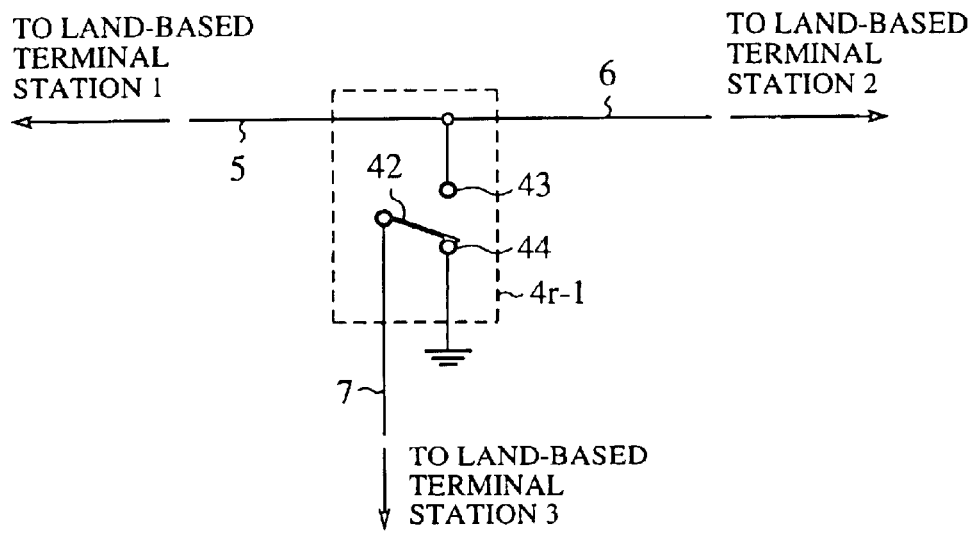
FIG. 5A is a conceptual view of an electric power feeding line selector switch used in an electric power feeding line switching system according to a second embodiment of the present invention.
Figure 5B:
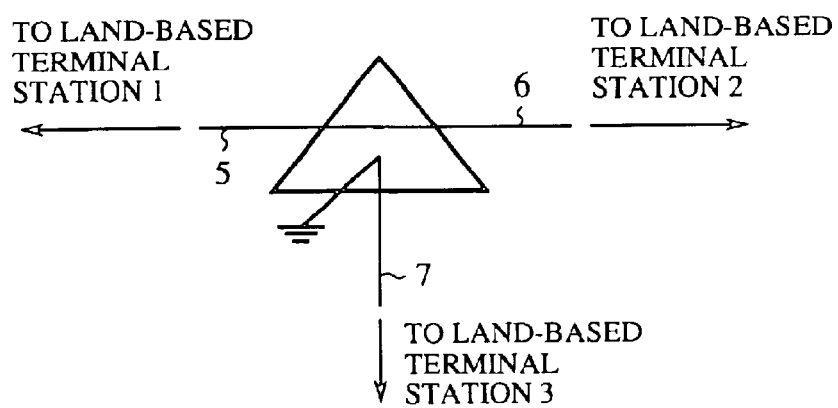
FIG. 5B is an explanatory view showing an initial state of electric power feeding lines set in the electric power feeding line selector switch shown in FIG. 5A.

FIG. 5A is a conceptual view of an electric power feeding line selector switch used in an electric power feeding line switching system according to a second embodiment of the present invention, and FIG. 5B is an explanatory view showing an initial state of electric power feeding lines set in the electric power feeding line selector switch shown in FIG. 5A. Constitutional elements, which are indicated by the same reference numerals as those shown in FIG. 1 to FIG. 4, are the same as those shown in FIG. 1 to FIG. 4. In FIG. 5A, a reference sign 4r-1 indicates an electric power feeding line selector switch in which the electric power feeding line 7 is connected with a pair of electric power feeding lines 5 and 6 connected with each other or is earthed. The electric power feeding line selector switch 4r-1 is operated according to the control signal F2, and a movable switching element 42 is connected with a fixed terminal 43 or 44. The electric power feeding line selector switch 4r-1 is equivalent to the electric power feeding line selector switch 4r shown in FIG. 2.

In this electric power feeding line switching system, as shown in FIG. 5A, the movable switching element 42 is connected with the fixed terminal 44 in an initial state in which the feeding of electric power to the repeaters 11 to 14 and the submarine branching apparatus 4 through the electric power feeding lines 5 and 6 is started. Therefore, as shown in FIG. 5B, in the initial state of the electric power feeding lines 5 to 7, the electric power feeding lines 5 and 6 are connected with each other while disconnecting the electric power feeding line 7 from the electric power feeding lines 5 and 6 by earthing one end of the electric power feeding line 7. Therefore, it is not required to change the connection relationship among the electric power feeding lines 5 to 7 during the feeding of electric power to the repeaters and the submarine branching apparatus 4, and the feeding of electric power to the repeaters and the submarine branching apparatus 4 through the electric power feeding lines can be easily performed in a start-up operation of the electric power feeding line switching system.

Also, in cases where an operator desires to examine an electrostatic capacity of the whole electric power feeding line switching system, the movable switching element 42 is connected with the fixed terminal 43 to connect the electric power feeding lines 5 to 7 with each other.

Accordingly, in the second embodiment, because at least one of a plurality of electric power feeding lines 5 to 7 is earthed in advance in the initial state of the electric power feeding lines 5 to 7, it is not required to change the connection relationship among the electric power feeding lines 5 to 7 during the feeding of electric power to the repeaters and the submarine branching apparatus 4, and the feeding of electric power to the repeaters and the submarine branching apparatus 4 through the electric power feeding lines can be easily performed in a start-up operation of the electric power feeding line switching system.

Embodiment 3

FIG. 6A is a block diagram of an electric power feeding line switching unit of the submarine branching apparatus arranged in the electric power feeding line switching system according to a third embodiment of the present invention, and FIG. 6B is a conceptual view of a switching-unit-voltage monitoring unit of the electric power feeding line switching unit shown in FIG. 6A. Constitutional elements of FIG. 6A and FIG. 6B, which are indicated by the same reference numerals as those shown in FIG. 1 to FIG. 5B, are the same as those shown in FIG. 1 to FIG. 5B.

In FIG. 6A and FIG. 6B, 104 indicates an electric power feeding line switching unit of a submarine branching apparatus. 51 indicates a switching-unit-voltage monitoring unit (or a monitoring means) of the electric power feeding line switching unit 104. In the switching-unit-voltage, monitoring unit 51, voltages (or electric potentials) of the fixed terminals 43 and 44 of the electric power feeding line selector switch 4r-1 are detected, and a difference of the voltages (or an electric potential difference) is monitored. The voltage at the fixed terminal 44 is a ground level. 52 indicates a monitor signal outputting unit (or a monitor signal outputting means) of the electric power feeding line switching unit 104. 61 indicates a photo coupler of the electric power feeding line switching unit 104. In the photo coupler 61, an optical signal transmitting through the submarine cable transmission paths 21 to 23 is received, and the optical signal is transmitted to the optical signal receiving circuit 4p and the monitor signal outputting unit 52.

Also, 51a indicates a voltage detecting circuit of the switching-unit-voltage monitoring unit 51. A monitor signal indicating the difference of the voltages is produced in the voltage detecting circuit 51a. 51b indicates a monitor signal modulating circuit of the switching-unit-voltage monitoring unit 51. A modulated monitor signal is produced from the monitor signal in the monitor signal modulating circuit 51b.

Also, 52b indicates an excited light source of the monitor signal outputting unit 52. An excited light is generated in the excited light source 52b. 52a indicates an excited light source actuating circuit. The excited light source actuating circuit 52a actuates the excited light source 52b according to the modulated monitor signal to make the excited light source 52b generate an optical monitor signal. 52c indicates a photo detector. The optical monitor signal generated in the excited light source 52b is detected in the photo detector 52c and is fed back to the excited light source actuating circuit 52a. 52d indicates a photo coupler. 52e indicates an erbium doped optical fiber. In the photo coupler 52d and the erbium doped optical fiber 52e, the optical monitor signal generated in the excited light source 52b is superposed on the optical communication signal F1 received in the photo coupler 61. 52f indicates an isolator. The transmission of the optical communication signal F1 including the optical monitor signal is limited to one direction in the isolator 52f.

As shown in FIG. 6B, in cases where communication is, for example, performed between the land-based terminal stations 1 and 2, voltages (or electric potentials) of the fixed terminals 43 and 44 of the electric power feeding line selector switch 4r-1 are detected in the voltage detecting circuit 51a to produce a monitor signal indicating a difference of the voltages (or an electric potential difference), the monitor signal is output to the monitor signal modulating circuit 51b through an analog-to-digital converting unit (not shown). More precisely, an electric potential difference between a line point A of the electric power feeding line 5 and an earth point B is detected from a prescribed divided potential difference determined by a series of resistors R1 and R2. In the monitor signal modulating circuit 51b, a modulated monitor signal is produced from the monitor signal and is output to the excited light source actuating circuit 52a. The excited light source actuating circuit 52a actuates the excited light source 52b according to the modulated monitor signal to make the excited light source 52b generate an optical monitor signal. The optical monitor signal is superposed on the optical communication signal F1 of the submarine cable transmission paths 21 and 22 in the photo coupler 52d and the erbium doped optical fiber 52e and is transmitted to the land-based terminal stations 1 and 2 through the isolator 52f. Also, if necessary, the optical monitor signal is superposed on the optical communication signal F1 of the submarine cable transmission path 23 and is transmitted to the land-based terminal station 3.

In the land-based terminal stations 1 and 2, the optical monitor signal is demultiplexed from the optical communication signal F1 and is converted into an electric monitor signal, and the electric monitor signal is demodulated to monitor the electric potential difference between the line point A and the earth point B according to the demodulated monitor signal. Thereafter, to maintain a feeding current supplied to the repeaters 11 to 14, a voltage at the first land-based terminal station 1 is heightened (or lowered), and a voltage at the second land-based terminal station 2 is lowered (or heightened). In cases where an operator desires to switch from the connection of the electric power feeding lines 5 and 6 to another connection, a control signal. F2 indicating the switching of the connection to another connection is transmitted from the land-based terminal station 1 or 2 to the submarine branching apparatus 4 when the demodulated monitor signal indicates that the electric potential difference between the line point A and the earth point B is almost zero or reaches a minimum value. Therefore, when the electric power feeding line selector switch 4r-1 is operated according to the optical control signal F2 to switch from the connection of the electric power feeding lines 5 and 6 to another connection, because the electric potential difference between the line point A and the earth point B is almost zero or reaches a minimum value, an electric stress such as an induced voltage applied to the electric power feeding line selector switch 4r-1 is reduced, and the electric power feeding line selector switch 4r-1 is smoothly and reliably operated.

Accordingly, in the third embodiment, an optical monitor signal indicating an electric potential difference between the fixed terminals 43 and 44 of the electric power feeding line selector switch 4r-1 is transmitted to the land-based terminal stations 1 and 2, the electric potential difference is always monitored in the land-based terminal stations 1 and 2 according to the optical monitor signal, a control signal F2 is transmitted from the land-based terminal station 1 or 2 to the submarine branching apparatus 4 when the electric potential difference is almost zero or reaches a minimum value, and the electric power feeding line selector switch 4r-1 is operated according to the control signal F2. Therefore, an electric stress applied to the electric power feeding line selector switch 4r-1 can be reduced in the operation of the electric power feeding line selector switch 4r-1, a relay circuit, which has a comparatively low withstand voltage and is cheap, can be used as the electric power feeding line selector switch 4r-1. Also, the electric power feeding line selector switch 4r-1 can be smoothly and reliably operated to switch from the connection to another connection.

Embodiment 4

Figure 7:
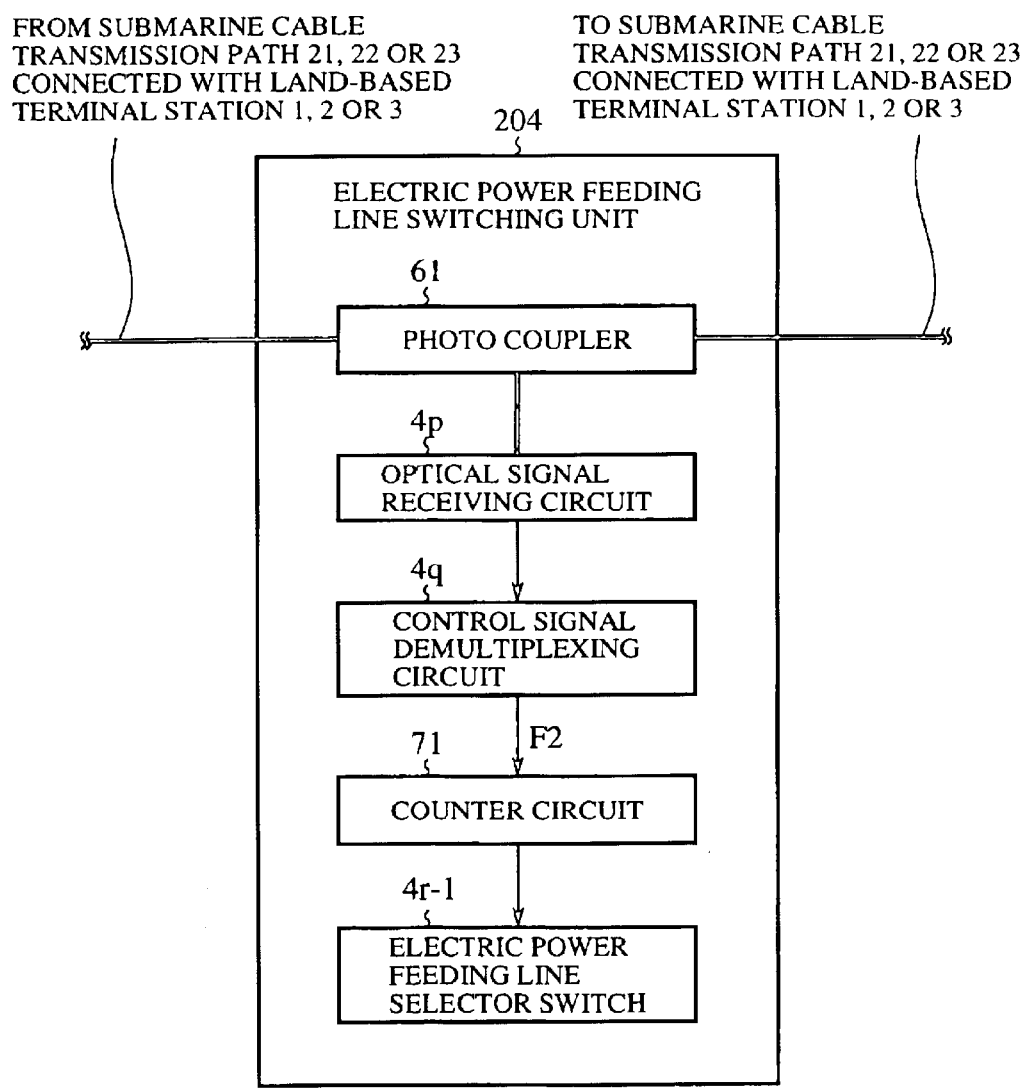
FIG. 7 is a block diagram of an electric power feeding line switching unit arranged in a submarine branching apparatus according to a fourth embodiment of the present invention.
Figure 8:
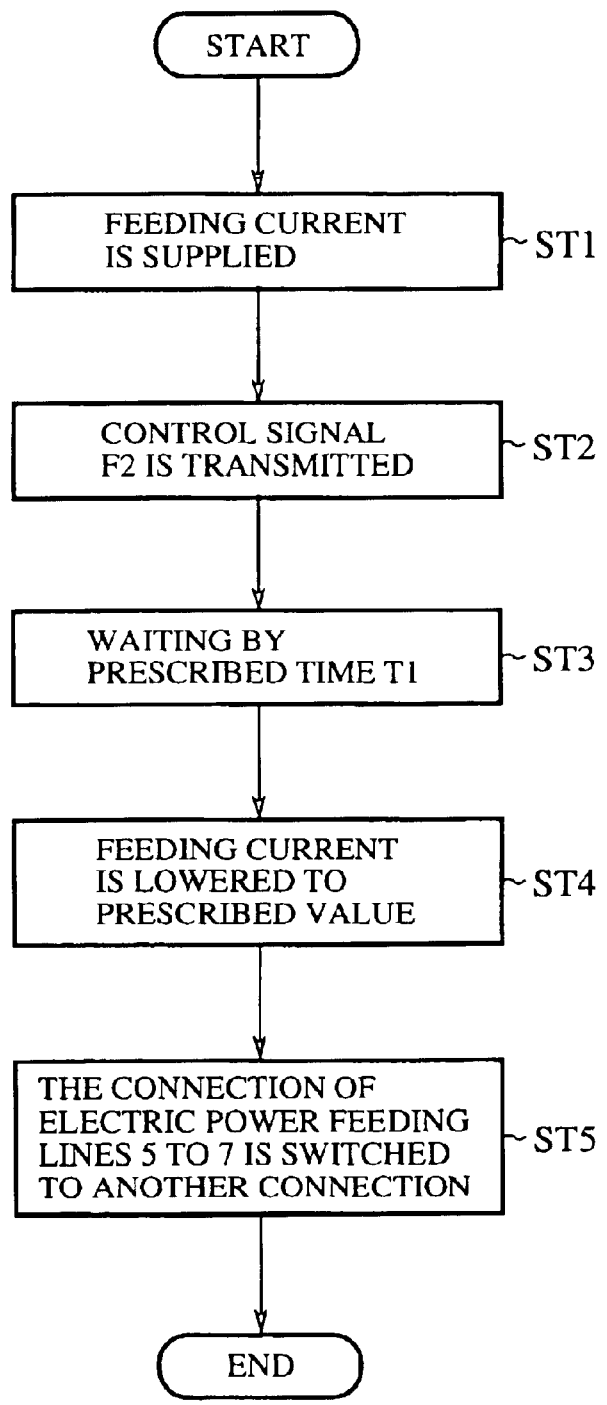
FIG. 8 is a flowchart showing an operation of the electric power feeding line switching unit shown in FIG. 7 according to an electric power feeding line switching method.

FIG. 7 is a block diagram of an electric power feeding line switching unit arranged in the submarine branching apparatus 4 according to a fourth embodiment of the present invention, and FIG. 8 is a flow chart showing an operation of the electric power feeding line-switching unit shown in FIG. 7 according to an electric power feeding line switching method. Constitutional elements of FIG. 7, which are indicated by the same reference numerals as those shown in FIG. 1 to FIG. 6A, are the same as those shown in FIG. 1 to FIG. 6A.

In FIG. 7, 71 indicates a counter circuit (or a selector switch control means) of an electric power feeding line switching unit (or an electric power feeding line switching apparatus) 204. When the control signal F2 demultiplexed in the control signal demultiplexing circuit 4q is received in the counter circuit 71, the control signal F2 is output to the electric power feeding line selector switch 4r-1 after a prescribed pre-set time T2 passes. The electric power feeding line switching unit 204 is arranged in the submarine branching apparatus 4 in place of the electric power feeding line switching unit 4a.

In the above configuration, an operation of the electric power feeding line switching unit 204 is described.

A feeding current (or electric power) is sufficiently supplied from the electric power feeding lines 5 to 7 to the repeaters 11 to 16 and the submarine branching apparatus 4 when no fault occurs in the electric power feeding lines 5 to 7 (step ST1).

Thereafter, when a fault occurs in a particular electric power feeding line 5, an optical control signal F2, which indicates the disconnection of the particular electric power feeding line 5 from the other electric power feeding lines 6 and 7 corresponding to no fault, is superposed on an optical communication signal F1 and is transmitted from one land-based terminal station 2 (or 3) connected with one electric power feeding line 6 (or 7) to the electric power feeding line switching unit 204 of the submarine branching apparatus 4 (step ST2). Therefore, the optical communication signal F1 including the optical control signal F2 is branched in the photo coupler 61 and is received in the optical signal receiving circuit 4p, and the optical control signal F2 is demultiplexed from the optical communication signal F1 in the control signal demultiplexing circuit 4q.

Thereafter, when a prescribed time T1 passes after the transmission of the control signal F2 (step ST3), the feeding currents supplied to the electric power feeding lines 6 and 7 are respectively reduced to a prescribed value in the land-based terminal stations 2 and 3 which are connected with the electric power feeding lines 6 and 7 corresponding to no fault (step ST4), and a prescribed feeding current is received in the electric power feeding line switching unit 204 of the submarine branching apparatus 4. In this case, the prescribed feeding current supplied to the electric power feeding line switching unit 204 is a minimum current required to operate the counter circuit 71 and the electric power feeding line selector switch 4r-1.

Thereafter, when a prescribed pre-set time T2 (T2>T1) passes after the control signal F2 demultiplexed in the control signal demultiplexing circuit 4q is received in the counter circuit 71, an operation signal is output from the counter circuit 71 to the electric power feeding line selector switch 4r-1 to operate the electric power feeding line selector switch 4r-1, and the connection of the electric power feeding lines 5 to 7 is changed in the electric power feeding line selector switch 4r-1 according to the operation signal on condition that a minimum current, which is required to operate the counter circuit 71 and the electric power feeding line selector switch 4r-1, is supplied to the electric power feeding line switching unit 204 (step ST5). That is, one end of the particular electric power feeding line 5 is earthed to disconnect the particular electric power feeding line 5 from the electric power feeding lines 6 and 7.

Therefore, because the connection of the electric power feeding lines 5 to 7 is changed on condition that the feeding current supplied to the electric power feeding line switching unit 204 is reduced to the minimum current required to operate the counter circuit 71 and the electric power feeding line selector switch 4r-1, an electric stress, which occurs in the connection switching of the electric power feeding lines 5 to 7 performed in the electric power feeding line selector switch 4r-1, can be reduced, and the connection of the electric power feeding lines 5 to 7 can be switched while electrically maintaining the electric power feeding lines 5 to 7 and the electric power feeding line selector switch 4r-1 to a stable state. In other words, because the connection switching of the electric power feeding lines 5 to 7 is not performed until the feeding current supplied to the electric power feeding line switching unit 204 is reduced to the minimum current, the connection of the electric power feeding lines 5 to 7 can be switched in a stable state of the electric power feeding line system.

As a result, because the connection of the electric power feeding lines 5 to 7 is switched in the electric power feeding line selector switch 4r-1 after the feeding currents supplied to the electric power feeding lines 6 and 7 are respectively reduced to the prescribed value, the connection switching of the electric power feeding lines 5 to 7 can be performed more stably as compared with that in the third embodiment.

Accordingly, in the fourth embodiment, because the connection of the electric power feeding lines 5 to 7 is switched in the electric power feeding line selector switch 4r-1 after the feeding currents supplied to the electric power feeding lines 6 and 7 are respectively reduced to the prescribed value, electric surge (or electric stress) occurring in a contact point of the electric power feeding line selector switch 4r-1 in the connection switching of the electric power feeding lines 5 to 7 can be reduced, the degradation of the contact point of the electric power feeding line selector switch 4r-1 can be avoided, an inoperative condition of the electric power feeding line selector switch 4r-1 can be avoided, and an adverse influence of the electric power feeding line system on other apparatuses can be avoided. Therefore, the electric power feeding line system can be operated at high reliability.

Embodiment 5

In this embodiment, the arrangement of a plurality of submarine branching apparatuses is enabled in an electric power feeding line system.

Figure 9:
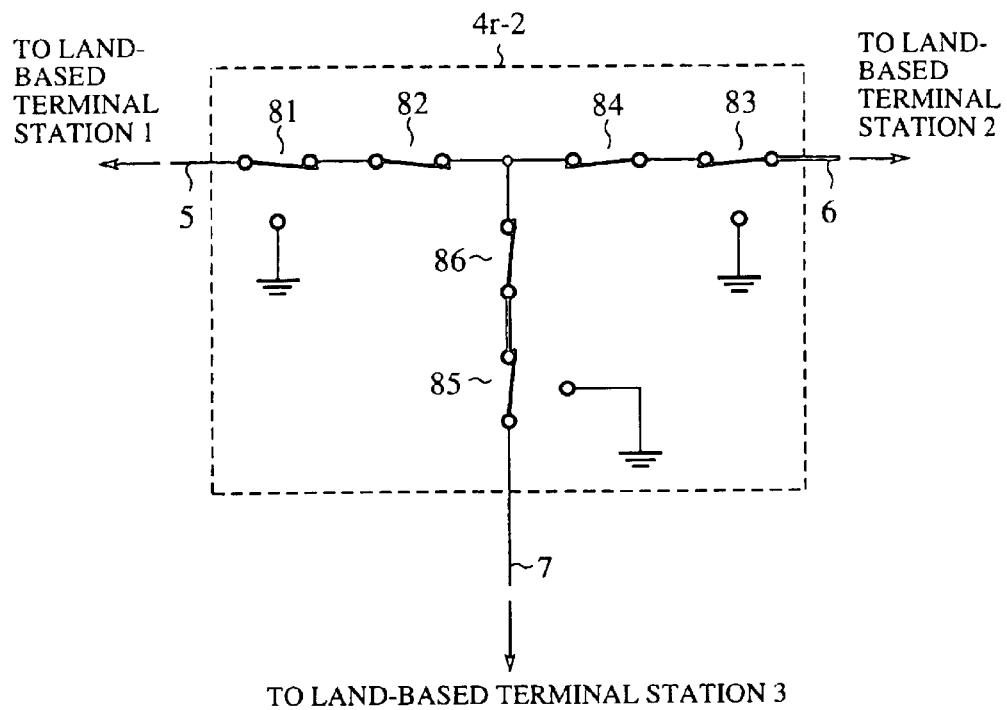
FIG. 9 is a constitutional view of an electric power feeding line selector switch arranged in an electric power feeding line switching unit of a submarine branching apparatus according to a fifth embodiment of the present invention.
Figure 10:
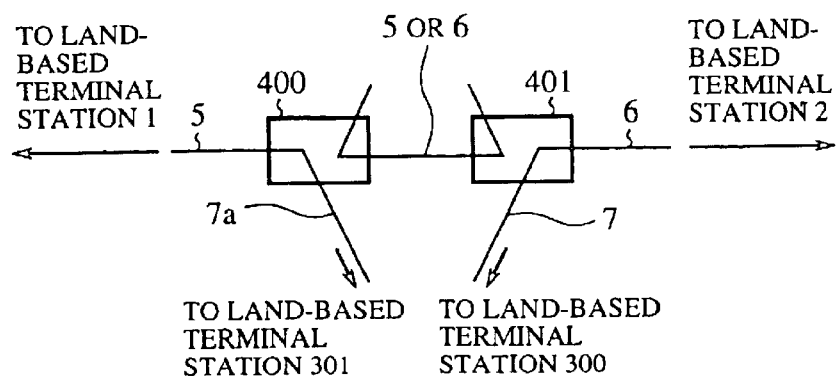
FIG. 10 is an explanatory view showing a connection pattern of electric power feeding lines in an electric power feeding line system in which a plurality of submarine branching apparatuses respectively having the electric power feeding line selector switch shown in FIG. 9 are arranged.
Figure 11:
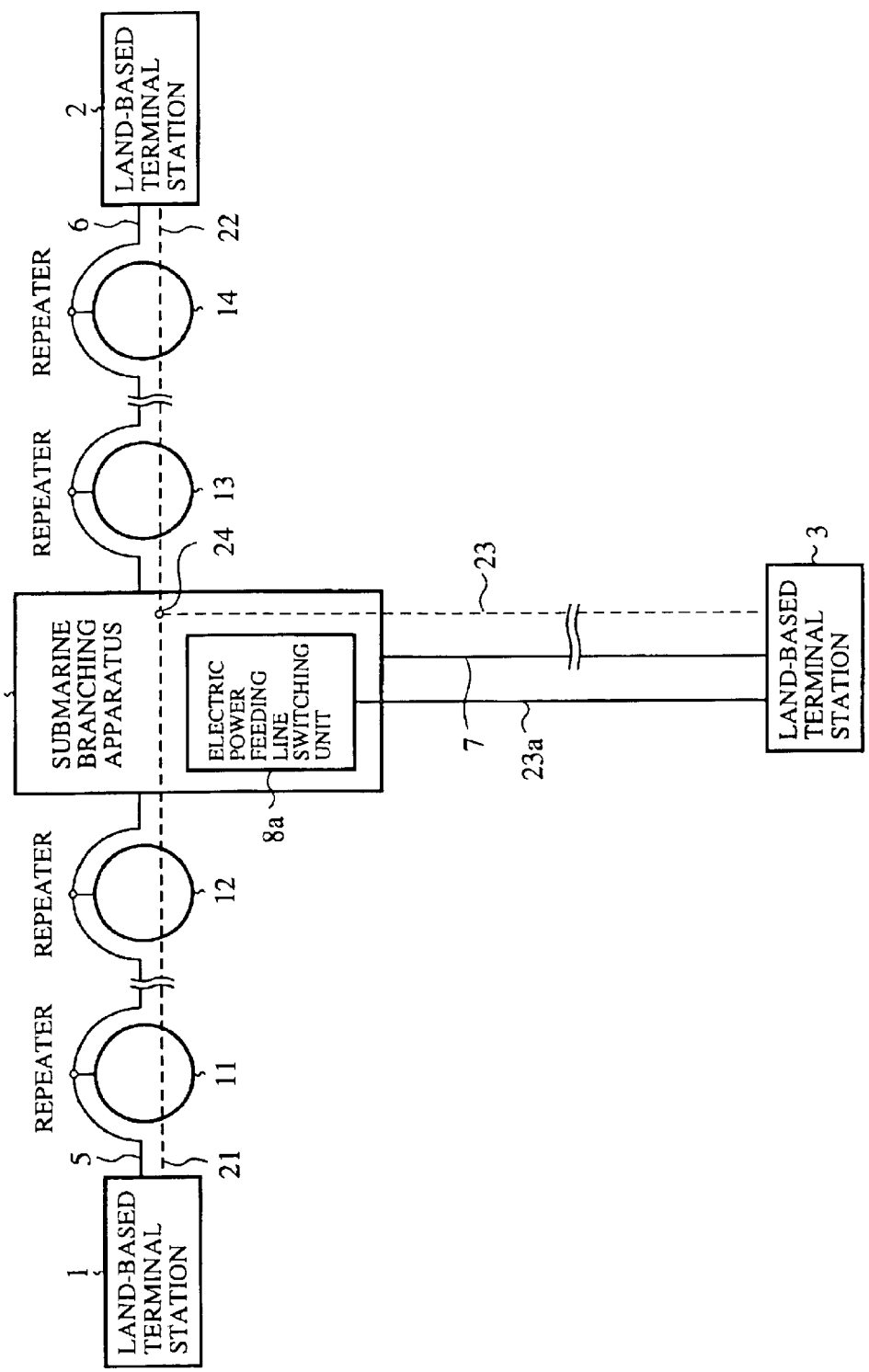
FIG. 11 is a constitutional view of a conventional electric power feeding line switching system in which submarine cable transmission paths and repeaters are arranged so as to supply electric power from electric power feeding lines, of which the connection is switched in a conventional electric power feeding line switching apparatus according to a conventional electric power feeding line switching method disclosed in the Application No. JP1-243734, to a signal of the submarine cable transmission paths through the repeaters.

FIG. 9 is a constitutional view of an electric power feeding line selector switch arranged in an electric power feeding line switching unit of a submarine branching apparatus according to a fifth embodiment of the present invention, and FIG. 10 is an explanatory view showing a connection pattern of electric power feeding lines in an electric power feeding line system in which a plurality of submarine branching apparatuses respectively having the electric power feeding line selector switch shown in FIG. 9 are arranged. Constitutional elements of FIG. 9 and FIG. 10, which are indicated by the same reference numerals as those shown in FIG. 1 to FIG. 7, are the same as the constitutional elements shown in FIG. 1 to FIG. 7.

In FIG. 9, a reference sign 4r-2 indicates an electric power feeding line selector switch of an electric power feeding line switching unit. 81 indicates a selector switching element in which the connection of the electric power feeding line 5 with the electric power feeding lines 6 and 7 or the earthing of the electric power feeding line 5 to the ground is selected. 82 indicates a selector switching element (or a for-opening-feeding-line selector switching element) in which the connection of the electric power feeding line 5 with the electric power feeding lines 6 and 7 or the opening of one end of the electric power feeding line 5 is selected. 83 indicates a selector switching element in which the connection of the electric power feeding line 6 with the electric power feeding lines 5 and 7 or the earthing of the electric power feeding line 6 to the ground is selected. 84 indicates a selector switching element (or a for-opening-feeding-line selector switching element) in which the connection of the electric power feeding line 6 with the electric power feeding lines 5 and 7 or the opening of one end of the electric power feeding line 6 is selected. 85 indicates a selector switching element in which the connection of the electric power feeding line 7 with the electric power feeding lines 5 and 6 or the earthing of the electric power feeding line 7 to the ground is selected. 86 indicates a selector switching element (or a for-opening-feeding-line selector switching element) in which the connection of the electric power feeding line 7 with the electric power feeding lines 5 and 6 or the opening of one end of the electric power feeding line 7 is selected.

In cases where a submarine branching apparatus having the electric power feeding line selector switch 4r-2 is used, as shown in FIG. 10, the electric power feeding line system, in which a plurality of submarine branching apparatuses 400 and 401 respectively having one electric power feeding line selector switch 4r-2 are arranged to show an example of a connection pattern of electric power feeding lines 5, 6, 7 and 7a, can be obtained. In this electric power feeding line system, the electric power feeding lines 5 and 7a are connected with each other between the land-based terminal station 1 and a land-based terminal station 301 through the selector switching elements 81, 82, 85 and 86 of the electric power feeding line selector switch 4r-2, the electric power feeding lines 6 and 7 are connected with each other between the land-based terminal station 2 and a land-based terminal station 300 through the selector switching elements 83 to 86 of the electric power feeding line selector switch 4r-2, and the electric power feeding line 5 or 6 connects the submarine branching apparatus 400 and the submarine branching apparatus 401 through the selector switching elements 81 to 84 of the electric power feeding line selector switches 4r-2 without earthing each of ends of the electric power feeding line 5 or 6 to make the electric power feeding line 5 or 6 have open ends. Therefore, the electric power feeding line system can have redundancy against the occurrence of a fault in one electric power feeding line, and the electric power feeding line system can be useful for almost all types of submarine cable systems.

Accordingly, in the fifth embodiment, though the configuration of the electric power feeding line selector switch 4r-2 is complicated, the electric power feeding line system can have redundancy against the occurrence of a fault in one electric power feeding line. Therefore, the electric power feeding line system is useful for almost all types of submarine cable systems and connection types of electric power feeding lines.

What is claimed is:

1. An electric power feeding line switching method, in which electric power is supplied from each of a plurality of electric power feeding lines to one of a plurality of repeaters with which a plurality of optical fiber transmission paths having a branching point are connected to supply the electric power to an optical communication signal transmitting through the optical fiber transmission paths, comprising the steps of:

superposing a control signal on the optical communication signal which transmits through the optical fiber transmission paths between terminal stations; and controlling a connection relationship among the electric power feeding lines according to the control signal superposed on the optical communication signal to switch from one connection of the electric power feeding lines to another connection of the electric power feeding lines.

2. An electric power feeding line switching method according to claim 1, wherein the step of superposing a control signal includes the step of superposing the control signal on the optical communication signal which is transmitted between terminal stations through the optical fiber transmission paths connected with the terminal stations.

3. An electric power feeding line switching method according to claim 1, further comprising the steps of:

transmitting a second control signal through one optical fiber transmission path, which is connected with one electric power feeding line corresponding to no fault through one repeater, in cases where a fault occurs in one of the electric power feeding lines;

earthing one end of the electric power feeding line corresponding to the fault on a side of a connection point of the electric power feeding lines according to the second control signal to disconnect the electric power feeding line corresponding to the fault from the electric power feeding lines corresponding to no fault; and connecting the electric power feeding lines corresponding to no fault with each other at the connection point to switch from the connection of all electric power feeding lines to another connection of the electric power feeding lines corresponding to no fault.

4. An electric power feeding line switching method according to claim 1, further comprising the steps of:

earthing one electric power feeding line on a side of a connection point of the electric power feeding lines in an initial state in which the feeding of the electric power to the other electric power feeding lines is started.

5. An electric power feeding line switching method according to claim 1, wherein the step of controlling a connection relationship includes the step of switching the connection of the electric power feeding lines while monitoring an electric potential difference between an electric potential of the electric power feeding lines connected with each other at a connection point and a ground level.

6. An electric power feeding line switching method according to claim 1, wherein the step of controlling a connection relationship comprises the steps of:

monitoring an electric potential difference between an electric potential of the electric power feeding lines connected with each other at a connection point and a ground level;

maintaining electric currents supplied to the electric power feeding lines; and switching the connection of the electric power feeding lines when the monitored electric potential difference is minimized.

7. An electric power feeding line switching method according to claim 1, wherein the step of controlling a connection relationship includes the step of switching the connection of the electric power feeding lines while reducing an electric current, which is supplied to a connection point of the electric power feeding lines, to a minimum current required to switch the connection of the electric power feeding lines.

8. An electric power feeding line switching method according to claim 1, wherein the step of controlling a connection relationship comprises the steps of:

controlling an electric current, which is supplied to a connection point of the electric power feeding lines, to a minimum current required to switch the connection of the electric power feeding lines;

demultiplexing the control signal from the optical communication signal; and automatically switching the connection of the electric power feeding lines according to the control signal demultiplexed from the optical communication signal after the electric current is controlled to the minimum current.

9. An electric power feeding line switching apparatus, in which a connection of a plurality of electric power feeding lines, each of which is connected with an optical fiber transmission path through a repeater to supply electric power from the electric power feeding lines to an optical communication signal of the optical fiber transmission paths through the repeaters, is switched, comprising:

optical signal receiving means for receiving the optical communication signal which includes a control signal and transmits through the optical fiber transmission paths between terminal stations;

control signal demultiplexing means for detecting the control signal by demultiplexing the control signal from the optical communication signal received by the optical signal receiving means; and an electric power feeding line selector switch for controlling the connection of the electric power feeding lines according to the control signal detected by the control signal demultiplexing means by switching one connection of the electric power feeding lines to another connection of the electric power feeding lines.

10. An electric power feeding line switching apparatus according to claim 9, wherein a second control signal, which transmits through one optical fiber transmission path connected with one electric power feeding line corresponding to no fault through one repeater, is received by the optical signal receiving means in cases where a fault occurs in one of the electric power feeding lines, one end of the electric power feeding line corresponding to the fault is earthed on a side of a connection point of the electric power feeding lines according to the second control signal by the electric power feeding line selector switch to disconnect the electric power feeding line corresponding to the fault from the electric power feeding lines corresponding to no fault, and the electric power feeding lines corresponding to no fault are connected with each other at the connection point according to the second control signal by the electric power feeding line selector switch to switch from the connection of all electric power feeding lines to another connection of the electric power feeding lines corresponding to no fault.

11. An electric power feeding line switching apparatus according to claim 9, further comprising:

monitoring means for monitoring an electric potential difference between an electric potential at a terminal of the electric power feeding line selector switch at which the electric power feeding lines are connected with each other and a ground level at another terminal of the electric power feeding line selector switch; and monitor signal outputting means for producing an optical monitor signal indicating the electric potential difference monitored by the monitoring means and outputting the optical monitor signal to one of the optical fiber transmission paths.

12. An electric power feeding line switching apparatus according to claim 9, wherein the electric power feeding line selector switch has a for-opening-feeding-line selector switching element for making one end of one electric power feeding line open on a side of a connection point of the electric power feeding lines.

13. An electric power feeding line switching system, in which a connection of a plurality of electric power feeding lines, each of which is connected with an optical fiber transmission path through a repeater to supply electric power from the electric power feeding lines to an optical communication signal of the optical fiber transmission paths through the repeaters, is switched, comprising:

a plurality of terminal stations, each of which is connected with one optical fiber transmission path and one electric power feeding line, for performing a communication operation by transmitting the optical communication signal through the optical fiber transmission paths between the terminal stations, supplying the electric power to the electric power feeding lines, superposing a control signal on the optical communication signal and outputting the control signal superposed on the optical communication signal; and an electric power feeding line switching apparatus for receiving the electric power from the terminal stations through the electric power feeding lines and switching from one connection of the electric power feeding lines to another connection of the electric power feeding lines according to the control signal transmitted from one of the terminal stations through one optical fiber transmission path.

14. An electric power feeding line switching system according to claim 13, wherein the electric power feeding line switching apparatus comprises optical signal receiving means for receiving the optical communication signal which includes a control signal and transmits through the optical fiber transmission paths;

control signal demultiplexing means for detecting the control signal by demultiplexing the control signal from the optical communication signal received by the optical signal receiving means; and an electric power feeding line selector switch configured to control the connection of the electric power feeding lines according to the control signal detected by the control signal demultiplexing means by switching one connection of the electric power feeding lines to another connection of the electric power feeding lines.

15. An electric power feeding line switching system according to claim 13, wherein the electric power is supplied from one or more terminal stations connected with one or more electric power feeding lines corresponding to no fault in cases where a fault occurs in one of the electric power feeding lines, a second control signal is transmitted from one terminal station, which is connected with a electric power feeding line corresponding to no fault, to the electric power feeding line switching apparatus through the optical fiber transmission path connected with the terminal station, one end of the electric power feeding line corresponding to the fault is earthed on a side of a connection point of the electric power feeding lines according to the second control signal by the electric power feeding line switching apparatus to disconnect the electric power feeding line corresponding to the fault from the electric power feeding lines corresponding to no fault, and the electric power feeding lines corresponding to no fault are connected with each other at the connection point according to the second control signal by the electric power feeding line switching apparatus to switch from the connection of all electric power feeding lines to another connection of the electric power feeding lines corresponding to no fault.

16. An electric power feeding line switching system according to claim 13, wherein one electric power feeding line is earthed on a side of a connection point of the electric power feeding lines in an initial state, in which the feeding of the electric power to the other electric power feeding lines is started, by the electric power feeding line switching apparatus.

17. An electric power feeding line switching system according to claim 13, wherein the electric power feeding line switching apparatus comprises:

monitoring means for monitoring an electric potential difference between an electric potential of a connection point of the electric power feeding lines connected with each other and a ground level; and monitor signal outputting means for producing an optical monitor signal indicating the electric potential difference monitored by the monitoring means and outputting the optical monitor signal to one terminal station through one optical fiber transmission path connected with the terminal station, the connection of the electric power feeding lines is switched according to the control signal by the electric power feeding line switching apparatus while the terminal station monitoring the electric potential difference according to the optical monitor signal.

18. An electric power feeding line switching system according to claim 17, wherein the terminal station supplies a feeding current to the electric power feeding lines to maintain the feeding current supplied to the electric power feeding line switching apparatus while monitoring the electric potential difference according to the optical monitor signal, the terminal station controls the feeding current to minimize the electric potential difference, and the electric power feeding line switching apparatus switches the connection of the electric power feeding lines in cases where the electric potential difference is minimized.

19. An electric power feeding line switching system according to claim 13, wherein the electric power feeding line switching apparatus comprises:

selector switch controlling means for controlling the connection switching of the electric power feeding lines to switch the connection of the electric power feeding lines according to the control signal after an electric current supplied to a connection point of the electric power feeding lines is reduced by one terminal station to a minimum current required to switch the connection of the electric power feeding lines.

20. An electric power feeding line switching system according to claim 13, wherein the electric power feeding line switching apparatus has a for-opening-feeding-line selector switching element configured to make one end of one electric power feeding line open on a side of a connection point of the electric power feeding lines.

* * * * *